(12) United States Patent
Hermosillo Valadez et al.

(10) Patent No.: US 7,945,117 B2
(45) Date of Patent: May 17, 2011

(54) METHODS AND SYSTEMS FOR REGISTRATION OF IMAGES

(75) Inventors: Gerardo Hermosillo Valadez, West Chester, PA (US); Senthil Periaswamy, Malvern, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 937 days.

(21) Appl. No.: 11/841,251

(22) Filed: Aug. 20, 2007

(65) Prior Publication Data

US 2008/0050043 A1 Feb. 28, 2008

Related U.S. Application Data

(60) Provisional application No. 60/839,279, filed on Aug. 22, 2006, provisional application No. 60/839,286, filed on Aug. 22, 2006, provisional application No. 60/839,287, filed on Aug. 22, 2006.

(51) Int. Cl.
*G06K 9/32* (2006.01)

(52) U.S. Cl. .................................. 382/294; 382/128

(58) Field of Classification Search ............ 382/294
See application file for complete search history.

(56) References Cited

U.S. PATENT DOCUMENTS

| | | | | |
|---|---|---|---|---|
| 4,737,921 A * | 4/1988 | Goldwasser et al. | ......... | 345/421 |
| 5,251,271 A * | 10/1993 | Fling | ............... | 382/162 |
| 5,611,000 A * | 3/1997 | Szeliski et al. | ............... | 382/294 |
| 5,631,981 A | 5/1997 | Rao | | |
| 5,633,951 A * | 5/1997 | Moshfeghi | ............... | 382/154 |
| 5,937,083 A * | 8/1999 | Ostuni | ............ | 382/131 |
| 5,987,164 A * | 11/1999 | Szeliski et al. | ............... | 382/154 |
| 6,075,905 A * | 6/2000 | Herman et al. | ............ | 382/284 |
| 6,097,854 A * | 8/2000 | Szeliski et al. | ............... | 382/284 |
| 6,157,747 A * | 12/2000 | Szeliski et al. | ............... | 382/284 |
| 6,359,617 B1 * | 3/2002 | Xiong | ................. | 715/848 |
| 6,373,998 B2 * | 4/2002 | Thirion et al. | ............... | 382/294 |
| 6,587,601 B1 * | 7/2003 | Hsu et al. | ............... | 382/294 |
| 6,681,057 B1 | 1/2004 | Nair | | |
| 7,106,891 B2 * | 9/2006 | Wyman et al. | ............... | 382/128 |
| 7,394,921 B2 * | 7/2008 | Sun et al. | ............... | 382/128 |
| 7,602,997 B2 * | 10/2009 | Young | ............... | 382/299 |
| 7,639,896 B2 * | 12/2009 | Sun et al. | ............... | 382/294 |
| 7,653,264 B2 * | 1/2010 | Hero et al. | ............... | 382/294 |
| 7,693,348 B2 * | 4/2010 | Zavadsky et al. | ............. | 382/294 |
| 2002/0141626 A1 * | 10/2002 | Caspi | ............... | 382/131 |
| 2004/0032906 A1 * | 2/2004 | Lillig | ............... | 375/240.08 |
| 2005/0162681 A1 * | 7/2005 | Ng et al. | ............... | 358/1.14 |
| 2005/0201601 A1 * | 9/2005 | Sun et al. | ............... | 382/128 |
| 2007/0086678 A1 * | 4/2007 | Chefd'hotel et al. | ......... | 382/294 |

(Continued)

OTHER PUBLICATIONS

Periaswamy et al., "Elastic Registration in the Presence of Intensity Variations", IEEE Transactions on Medical Imaging, IEEE Service Center, Piscataway, NJ, vol. 22, No. 7, Jul. 2003, pp. 865-874.

(Continued)

*Primary Examiner* — Sath V Perungavoor
(74) *Attorney, Agent, or Firm* — Peter Withstandley

(57) ABSTRACT

A method for registering images, for example medical images, includes acquiring a first image. A second image is acquired. A deformation field for registering the second image to the first image is calculated. The deformation field includes a sum of a plurality of weighted distortion vectors each of which has a substantially Gaussian distribution. The calculated deformation field is applied to the second image to register it to the first image.

6 Claims, 4 Drawing Sheets

U.S. PATENT DOCUMENTS

| | | | |
|---|---|---|---|
| 2007/0104358 A1* | 5/2007 | Komatsu | 382/151 |
| 2008/0050043 A1* | 2/2008 | Hermosillo Valadez et al. | 382/294 |
| 2009/0190809 A1* | 7/2009 | Han et al. | 382/128 |
| 2009/0304252 A1* | 12/2009 | Hyun et al. | 382/131 |

OTHER PUBLICATIONS

Wei et al., "Intensity- and Gradient-Based Stereo Matching Using Hierarchical Gaussian Basis Functions", IEEE Transactions on Pattern Analysis and Machine Intelligence, IEEE Service Center, Los Alamitos, CA, vol. 20, No. 11, Nov. 1998, pp. 1143-1160.

Periaswamy et al., "Medical image registration with partial data", Medical Image Analysis, Oxford University Press, Oxford, GB, vol. 10, No. 3, Jun. 2006, pp. 452-464.

Xiaoyan et al., "Differential evolution with powell's direction set method in medical image registration", Biomedical Imaging: Macro to Nano, 2004, IEEE International Symposium on Arlington, VA, Apr. 15-18, 2004, Piscataway, NJ, pp. 732-7353.

* cited by examiner

METHODS AND SYSTEMS FOR REGISTRATION OF IMAGES

CROSS-REFERENCE TO RELATED APPLICATION

The present application is based on provisional application Ser. Nos. 60/839,279 filed Aug. 22, 2006; 60/839,286 filed Aug. 22, 2006; and 60/839,287 filed Aug. 22, 2006, the entire contents of which are herein incorporated by reference.

BACKGROUND OF THE INVENTION

1. Technical Field

The present disclosure relates to image registration and, more specifically, to methods and systems for the registration of medical images.

2. Discussion of the Related Art

Medical imaging is the field of visualizing an internal structure of a patient subject using an image acquisition device. Examples of image acquisition devices include Computed Tomography (CT) scanners, Magnetic Resonance (MR) scanners, Positron Emission Tomography (PET) scanners, Single Positron Emission Tomography (SPECT) scanners and ultrasound scanners.

Medical imaging data may be acquired, for example, by scanning the subject with one of the above-named scanners. The acquired data may then be processed using computers to generate a visual representation of the internal structure of the subject. For example, in CT scanning, imaging data is rendered into a set of two-dimensional slices that are combined to form a three-dimensional visualization of the internal structure.

Medical images may be used by a practitioner, for example a radiologist, to identify injury and disease in the subject. To this end, it is often beneficial to combine imaging data from two or more medical images to add to the total amount of information that may be represented in the visual representation. The process of combining imaging data from multiple medical images is known as image registration. Image registration may thus be used to combine multiple images acquired from the same scanner, for example, to combine two CT images, or to combine multiple images from different scanners, for example, a CT image and an MR image.

Image registration of images may be used to align multiple images such that after registration, an overlay of the multiple images may show the same anatomical structure at the same position.

Rigid registration has been developed as a technique for registering two discrete images. In rigid registration, a transformation function may be applied to a first image known as the deformed image to map the deformed image onto a second image known as reference image. In rigid registration, the transformation function may be a linear matrix that is multiplied by each pixel of the deformed image to map that pixel onto the reference image. Thus, the transformation function is used to provide output coordinates for a given set of input coordinates.

Image registration is complicated by the fact that structures within the human body may change shape and relative location as a result of either normal conditions or as disease progresses. Under such conditions, rigid image registration may not be able to effectively map the deformed image to the reference image. Accordingly, techniques for non-rigid registration have been developed. In non-rigid registration, a non-rigid transformation model is used to map the deformed image to the reference image in a way that allows for and corrects for distortion of the internal structure of the subject in a non-linear manner.

While non-rigid transformation models have been developed, their implementation may be time consuming.

SUMMARY

A method for registering images includes the following steps: A first image is acquired. A second image is acquired. A deformation field for registering the second image to the first image is calculated. The deformation field includes a sum of weighted component deformation fields, each of which includes a distortion vector with an amplitude that is spatially distributed according to a substantially Gaussian distribution. The calculated deformation field is applied to the second image to register it to the first medical image.

A method for registering images within an image registration device includes the following steps: A first image and a second image are acquired from a image database. A deformation field for registering the second image to the first image is calculated. The deformation field includes a sum of weighted component deformation fields, each of which includes a distortion vector with an amplitude that is spatially distributed according to a substantially Gaussian distribution. The calculated deformation field is applied to the second image to register it to the first image. The first image and the deformed second image are displayed on a display device.

A method for registering images includes the following steps: A first image is acquired. A second image is acquired. A distortion field for registering the second image to the first image is calculated. The distortion field includes a polynomial model. The calculated distortion field is applied to the second image to register it to the first image.

A method for registering images within an image registration device includes the following steps: A first image and a second image are acquired from a image database. A distortion field for registering the second image to the first image is calculated. The distortion field comprises a polynomial model. The calculated distortion field is applied to the second image to register it to the first image. The first image and the distorted second image are displayed on a display device.

A method for registering images includes the following steps: A reference image is acquired. A moving image is acquired. A gradient field is calculated for the reference image. An incremental deformation is generated based on the calculated gradient. The generated incremental deformation is temporarily applied to the reference image to determine whether the generated incremental deformation has increased a degree of registration between the reference and moving images. An inverse of the incremental deformation is applied to the moving image when the incremental deformation has increased the degree of registration between the images.

A method for registering images within an image registration device includes the following steps: A reference image is acquired. A moving image is acquired. A gradient field is calculated for the reference image. An incremental deformation is generated based on the calculated gradient. The generated incremental deformation is temporarily applied to the reference image to determine whether the generated incremental deformation has increased a degree of registration between the reference and moving images. An inverse of the incremental deformation is applied to the moving image when the incremental deformation has increased the degree of registration between the images. The first image and the deformed second image are displayed on a display device.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
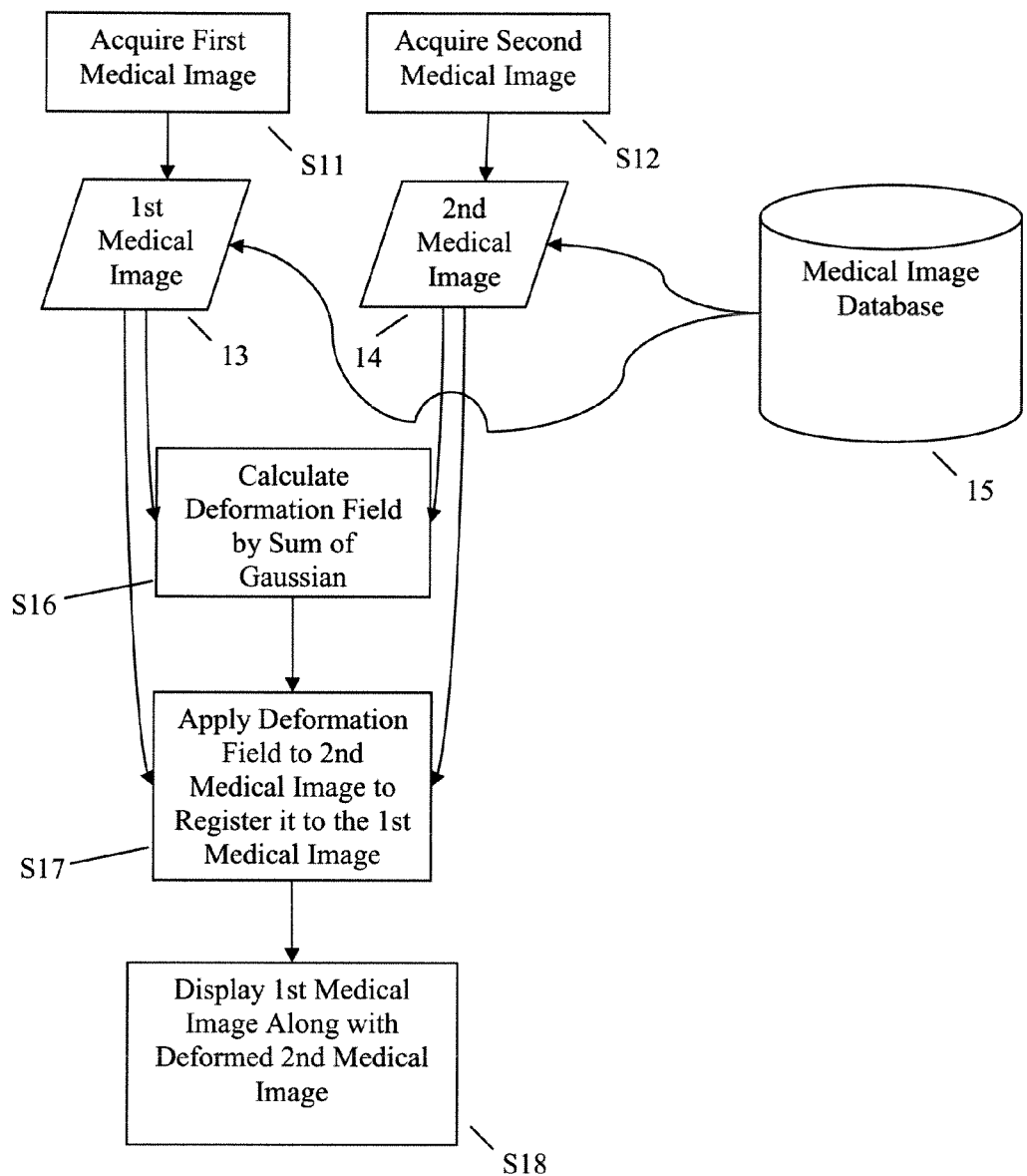
FIG. 1 is a flow chart illustrating a method for registering medical images according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide methods and systems for registration of medical images, although the present invention may be applied to non-medical images. Images may be 2-dimensional, or may be n-dimensional, where n is greater than 2. Such methods may utilize novel non-rigid transformation models to quickly and accurately determine a deformation field that may be used to map a deformed image to a reference image. Examples of non-rigid transformation models include the Sum of Vector valued Gaussians model and the Polynomial model.

Exemplary embodiments of the present invention additionally provide for the alignment of multiple images through the use of fixed vector maps.

Registration of medical images may be performed on images from any of a variety of sources, for example, images may be computed tomography (CT) scans, magnetic resonance (MR) scans, positron emission tomography (PET) scans, and single positron emission tomography (SPET) scans. In performing registration, the two images being registered may either be from the same scanning technology, for example, two CT images, or may be from different technologies, for example, an MR image and a CT image.

Examination of registered images may provide diagnostic information including the study of tumor growth, effects of therapy on tumors, study of anatomical variations, study of contrast absorption for abnormality detection, etc.

Sum of Vector Valued Gaussians Model

According to one approach for determining a deformation field that may be used to map a deformed image to a reference image according to an exemplary embodiment of the present invention, a suitable deformation field may be determined according to a sum of Vector Valued Gaussians model.

The deformation field may be conceptualized as a set of three-dimensional vectors that describes how each pixel of the deformation image must be transposed in the x, y and z directions such that it arrives at its proper location on the reference image.

The sum of Vector valued Gaussians model allows for the development of a suitable deformation field by defining points of distortion within the three-dimensional image space. Each point of distortion is defined as a three-dimensional Gaussian distribution and a distortion vector. At the center of the Gaussian, the distortion vector defines the localized distortion. As one moves away from the center of the Gaussian, the shape of the Gaussian defines the relative weight of the distortion vector. Thus points at the center of the Gaussian are transformed with the full weight of the distortion vector while points away from the center of the Gaussian are transformed with a partial weight of the distortion vector in proportion to the distance from the center.

Thus the full distortion field may be conceptualized as the sum of multiple vector valued Gaussians. Each Gaussian may be represented by a set free parameters and thus the distortion field may be represented by the sets of free parameters for all of the Gaussians. Moreover, the smoothness of the three-dimensional Gaussians provides for a smooth displacement field.

Examples of suitable free parameters include: (1) a number of Gaussians used to describe the distortion field, (2) a position of each Gaussian in the three-dimensional image space, (3) a vector that acts as a weight on the Gaussian in the x, y and z directions for each Gaussian, and (4) a covariance matrix of each Gaussian. The number of Gaussians used may be selected according to the image being transformed. The greater the number, the more complex the distortion field becomes. The position of each Gaussian in the three-dimensional image space may be, for example, the location of the center point. The vector that acts as a weight may be the localized distortion at the center point. The covariance matrix may define the shape of the Gaussian and thus how quickly the weight tapers off as points get farther away from the center point.

The set of free parameters may thus be used in determining the deformation field. As changes to the parameters results in a different deformation field, the free parameters may be optimized to determine an optimum deformation field.

An error metric may be selected to measure the fitness of a resulting deformation field. The error metric thus represents the difference between the resulting deformation field and the optimal deformation field. Accordingly, the free parameters may be optimized to minimize the selected error metric.

An appropriate error metric may be selected, for example, based on the specific image being transformed. The selected error metric may then be minimized using a known technique such as, for example, a conjugate gradient minimization technique. Minimization is performed by adjusting the free parameters until the error metric is at a minimum. This process may be iterative, for example, the parameters may be selected and changed until the minimum is found. This may be performed, for example, by computing the derivatives for the error metric with respect to the free parameters.

FIG. 1 is a flow chart illustrating a method for registering medical images according to an exemplary embodiment of the present invention. A first medical image 13 may be acquired (Step S11). A second medical image 14 may also be acquired (Step S12), which may occur before, after, or contemporaneously with the first medical image 13. The first and second medical images 13 and 14 may be acquired from a medical image database 15. Alternatively, the medical images 13 and 14 may be acquired directly from a medical image scanner.

A deformation field may be calculated using a sum of Gaussian approach, for example, as described in detail above (Step S16). The calculated deformation field may then be applied to the second medical image 14 to register the second medical image 14 to the first medical image 13 (Step S17). Finally, the first medical image and the deformed second medical image may be displayed on a display device (Step S18). For example, the images may be superimposed.

Polynomial Model

According to one approach for determining a deformation field that may be used to map a deformed image to a reference image according to an exemplary embodiment of the present invention, a suitable deformation field may be determined according to polynomial models.

In linear modeling, a linear distortion field may be conceptualized as a linear equation that transforms each pixel of the distorted image onto the reference image. For example, a pixel at (x, y, z) may become $(a_1 x + a_2, a_3 y + a_4, a_5 z + a_6)$.

However, exemplary embodiments of the present invention utilize polynomial modeling, for example, using at least second order polynomials of a degree n where n is greater or equal to 2, to transform each pixel of the distorted image onto the reference image. For example, a pixel at (x, y, z) may become $(a_1 x^2 + a_2 x + a_3, a_4 y^2 + a_5 y + a_6, a_7 z^2 + a_8 z + a_9)$ using a binomial (second order polynomial) model. The general case transformation that indicates how each pixel is to be transformed is expressed by a transformation matrix. Accordingly, the distorted pixel position on the reference image may be calculated by multiplying the pixel's coordinates by the transformation matrix.

By providing higher order polynomials, non-linear non-rigid registration may be performed. For example, a zero-order polynomial may provide translation, a first order polynomial model may provide an affine transformation and can thus change scale, shear, rotation and translation. Second-order polynomials can additionally handle single bends. In this approach, the model parameters consist of the coefficients of the polynomials, for example, $a_1, a_2, a_3, \ldots a_n$, which themselves are linear.

In minimizing the error metric, the model parameters may be determined and iteratively improved, for example, using the sum of squared differences between the images using a conjugate gradient minimization approach in which a gradient direction is first estimated. In such an approach, a similarity function, for example, the sum of the absolute differences between intensities of two images, may be calculated and minimized.

Accordingly, polynomial modeling, for example, at least second order polynomials, may be used to provide a quick and accurate registration for medical images.

Figure 2:
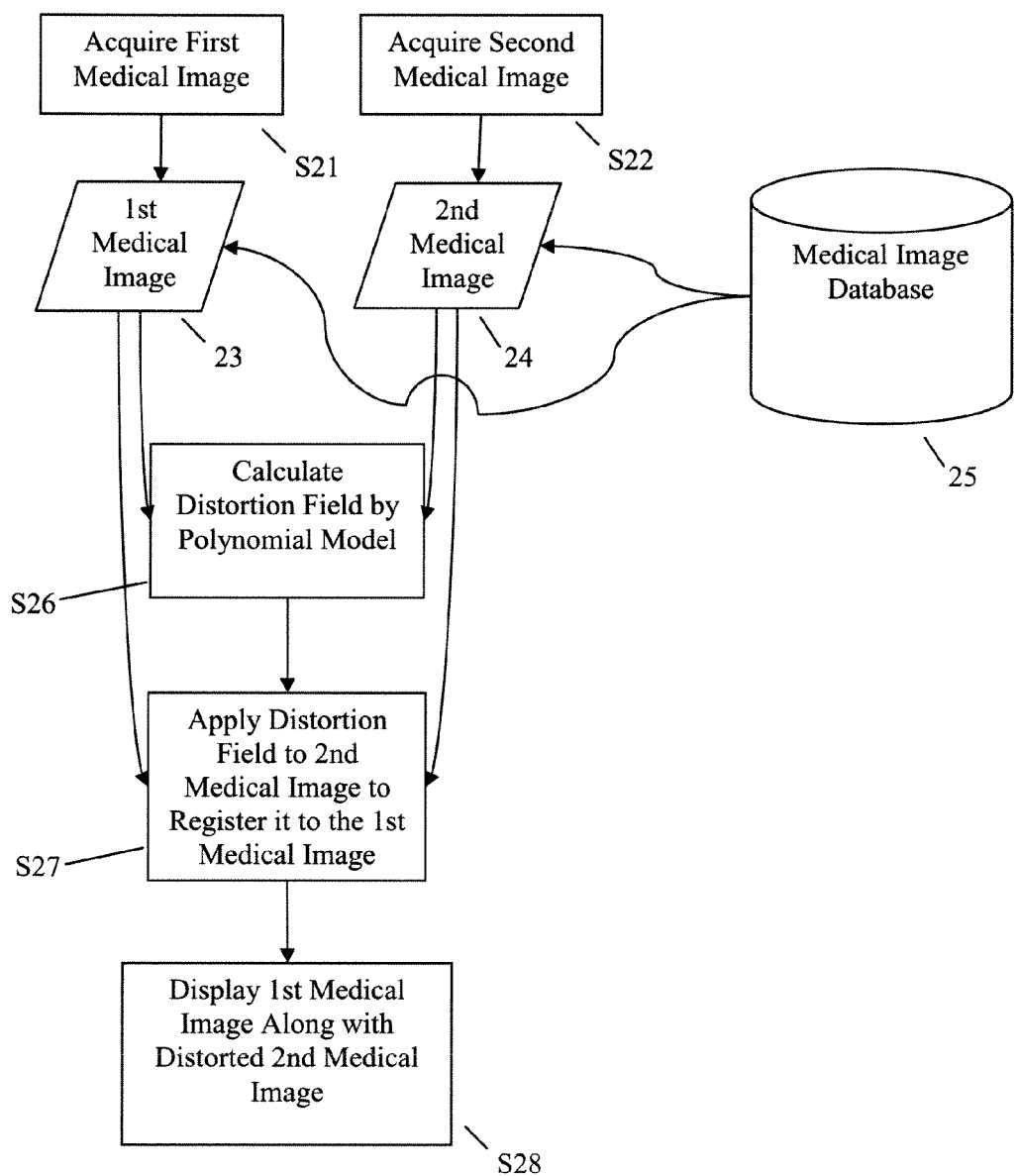
FIG. 2 is a flow chart illustrating a method for registering medical images according to an exemplary embodiment of the present invention.

FIG. 2 is a flow chart illustrating a method for registering medical images according to an exemplary embodiment of the present invention. A first medical image 23 may be acquired (Step S21). A second medical image 24 may also be acquired (Step S22). The first and second medical images 23 and 24 may be acquired from a medical image database 25. Alternatively, the medical images 23 and 24 may be acquired directly from a medical image scanner.

A distortion field may be calculated using a polynomial model, for example, as described in detail above (Step S26). The calculated distortion field may then be applied to the second medical image 24 to register the second medical image 24 to the first medical image 23 (Step S27). Finally, the first medical image and the distorted second medical image may be displayed on a display device (Step S28). For example, the images may be superimposed.

Fixed Vector Maps

As discussed above, a similarity function may be used to express the level of registration between the deformed image and the reference image. Image registration may therefore be achieved by optimizing the similarity function. An example of a similarity function is the mean square error. The mean square error function measures the sum of the absolute differences between the intensities of the deformed image and the reference image.

Optimization of the similarity function, for example, the mean square error function, can be accomplished, for example, by computing a gradient for the similarity function and applying a gradient-ascent algorithm to optimize it. Optimization may begin from an initial deformation, for example, the null deformation or identity mapping.

Optimization of the similarity function may be performed without regard to the deformation model used. Additionally, optimization may be performed without regard to the similarity function being used. Accordingly, any deformation model may be used, for example, rigid deformation, affine deformation and a sum of a set interpolating functions based on control points. The sum of Gaussian vector value model or the polynomial model, discussed above, may also be used with the techniques for optimizing the similarity function discussed below.

Exemplary embodiments of the present invention provide a fast gradient method for optimizing an image similarity function to achieve image registration. A gradient map, which is a weighted version of a fixed vector map, is computed once during the optimization process. Because the gradient map need only be computed once, the time required to complete the image registration process may be reduced without limiting robustness or precision of conventional approaches to image registration.

As discussed above, in performing image registration, a deformation map indicating the transformation from deformed image to reference image is sought. The deformation map is initially unknown and may be expressed by the following function:

$$\phi: \Re^3 \to \Re^3$$

Here, the images to be registered are assumed to be differentiable scalar functions:

$$I_1: \Re^3 \to \Re \text{ and } I_2: \Re^3 \to \Re$$

The similarity function may be denoted by S. Approaches to performing image registration may include solving for a displacement $\vec{u}(\vec{x})$ at each point $\vec{x} \in \Re^3$ such that $\phi(\vec{x}) = \vec{x} + \vec{u}(\vec{x})$. One of the images $I_1$ and $I_2$ may be chosen as the reference image. If $I_1$ is chosen as the reference image, the optimal deformation $\phi^*$ may be applied to $I_2$ to maximize the similarity between $I_1$ and $I_2 \circ \phi^*$, where "∘" denotes composition of functions. In this setting, the image registration may be achieved by solving the following optimization problem:

$$\phi^* = \underset{\phi}{\operatorname{argmax}} S(I_1, I_2 \cdot \phi)$$

which may be dealt with in the context of the calculus of variations. A gradient-based method may be applied for registering a reference image $I_1$ and a deformation image $I_2$ starting with an initial deformation $\phi_0$:

$$\begin{cases} \phi^* = \phi_0 \cdot \phi_1 \cdot \phi_2 \cdot \ldots \cdot \phi_\infty \\ \phi_k = id + \varepsilon \dfrac{\partial}{\partial \phi} S(I_1, I_2 \cdot \phi) \Big|_{\phi = \phi_0 \cdot \phi_1 \cdot \phi_2 \cdots \phi_{k-1}} \end{cases}$$

wherein ε>0 is small enough to provide for the invertibility of $\phi_k$, id denotes the identity mapping and $\phi_\infty$ represents $\phi_n$ for a value n large enough to attain convergence criteria. This process may also be expressed with the following pseudo-code:

→Start.
→Set i = 0.
→Set φ* = φ₀.
→While a stopping criterion is not reached:
    →Apply $\phi_i$ to I₂ in order to produce $I_2^i = I_2 \circ \phi_i$.
    →Compute the similarity function between I₁ and $I_2^i$.
    →Compute the gradient of S with respect to the deformation of I₂ at $\phi_i$
    →Add a fraction of the gradient to id in order to form $\phi_{i+1}$.
    →Set φ* = $\phi_i \circ \phi_{i+1}$.
    →Increment i by one.
→End.

Exemplary embodiments of the present invention optimize the similarity function using the following equation:

$$\begin{cases} \phi^* = \phi_0 \cdot \delta_1^{-1} \cdot \delta_2^{-1} \cdot \ldots \cdot \delta_\infty^{-1} \\ \phi_k = id + \varepsilon \dfrac{\partial}{\partial \delta} S(I_1 \cdot \delta, I_2 \cdot \phi_0 \cdot \delta_1^{-1} \cdot \delta_2^{-1} \cdot \ldots \cdot \delta_{k-1}^{-1}) \Big|_{\delta = id} \end{cases}$$

wherein ε>0 is small enough to provide for the invertibility of $\delta_k$, id denotes the identity of mapping and $\delta_\infty$ represents $\delta_n$ for a value n large enough to attain convergence criteria. This process may also be expressed with the following pseudo-code:

→Start.
→Set i = 0.
→Set φ* = φ₀.
→While a stopping criterion is not reached:
    →Apply $\phi_i$ to I₂ in order to produce $I_2^i = I_2 \circ \phi_i$.
    →Compute the similarity function between I₁ and $I_2^i$.
    →Compute the gradient of S with respect to a small deformation of I₁ at id.
    →Add a fraction of this gradient to id in order to form $\delta_{i+1}$.
    →Invert $\delta_{i+1}$ to produce $\delta_{i+1}^{-1}$.
    →Set φ* = $\phi_i \circ \delta_{i+1}^{-1}$.
    →Increment i by one.
→End.

In this approach, the gradient S with respect to a small deformation of I₁ at id involves estimating the gradient of the fixed reference image I₁ using the same vector map during the optimization process. Using this approach, the steps of calculating the actual gradient of the fixed reference image I₁ at multiple steps may be avoided. Moreover, according to exemplary embodiments of the present invention, the gradient of the fixed reference image I₁ need only be calculated at the sampling grid point. Interpolation need not be performed. The additional step of inverting $\delta_{i+1}$ does not carry a high computational cost because $\delta_{i+1}$, represents a relatively small deformation and accordingly, the inverse of $\delta_{i+1}$ may be fairly approximated by id−($\delta_{i+1}$−id).

Figure 3:
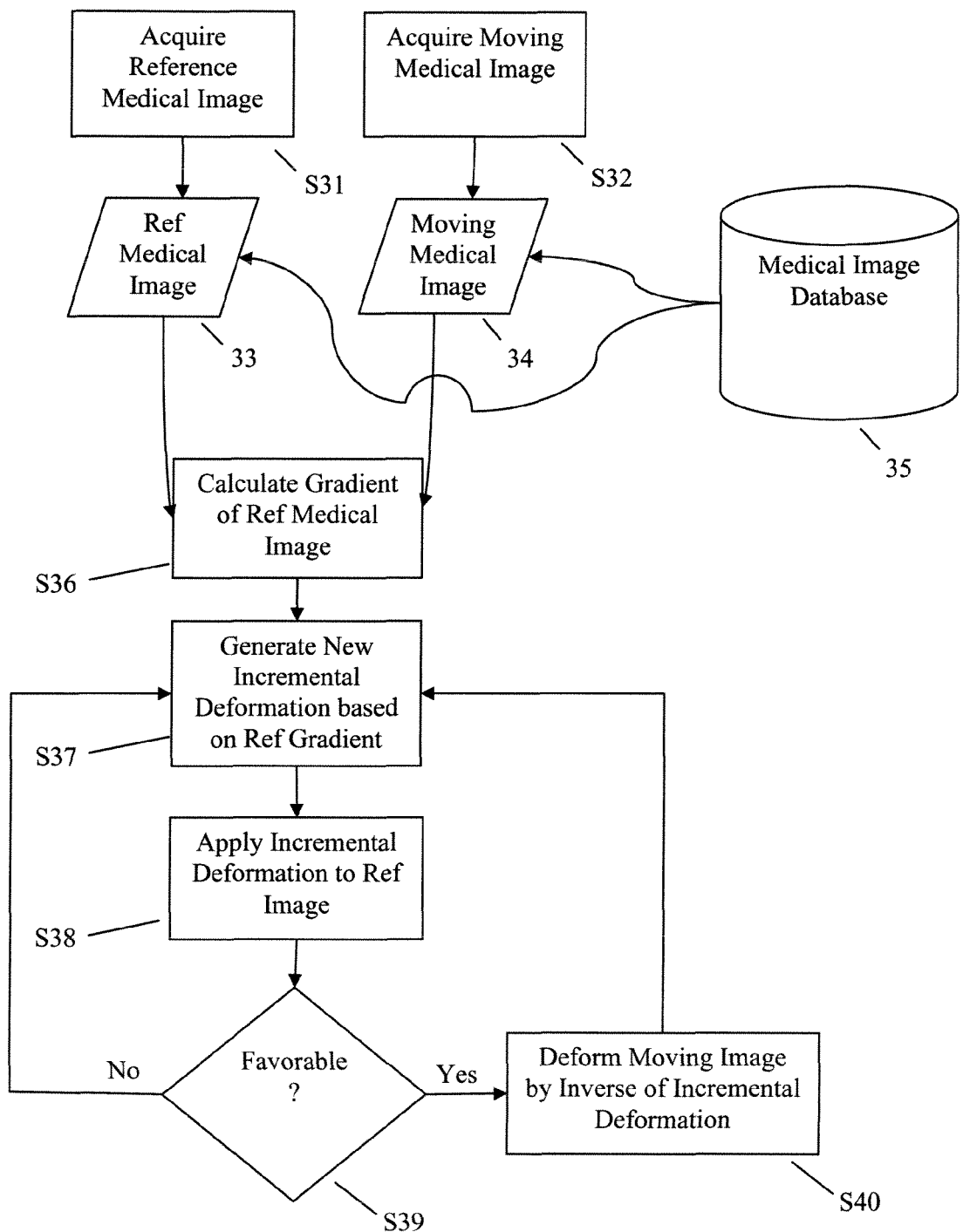
FIG. 3 is a flow chart illustrating a method for registering medical images according to an exemplary embodiment of the present invention.

FIG. 3 is a flow chart illustrating a method for registering medical images according to an exemplary embodiment of the present invention. A reference medical image 33 may be acquired (Step S31). A moving medical image 34 may also be acquired (Step S32). As used herein, the moving medical image 34 is the image that is deformed to coincide with the frame of reference of the reference medical image 33. The medical images 33 and 34 may be acquired from a medical image database 35. Alternatively, the medical images 33 and 34 may be acquired directly from a medical image scanner.

The gradient of the reference medical image 33 may be calculated (Step S36). This may be the first and only time a gradient of either medical image need be calculated. Because such a calculation may be expensive in terms of time and computational resources, exemplary embodiments of the present invention may be more efficient than conventional approaches that recalculate a gradient at each incremental deformation.

Next, a new incremental deformation may be calculated based on the calculated gradient of the reference medical image 33 (Step S37). The incremental deformation may then be applied to the reference medical image 33. This represents a meaningful change over the related art where incremental deformations are applied to the moving image rather than the reference image. It may then be determined whether the incremental deformation has improved registration (Step S39). If the incremental deformation has improved registration (Yes, Step S39), then the moving medical image may be deformed by the inverse of the incremental deformation (Step S40), the reference medical image may then be restored to its original state, and a next new incremental deformation may be generated (Step S37). However, if the incremental deformation has not improved registration (No, Step S39), then no change is made to the moving medical image, the reference medical image may be restored to its original state, and a next new incremental deformation may be generated (Step S37). Iterative improvement to the registration may thus continue until maximum registration has been achieved.

Figure 4:
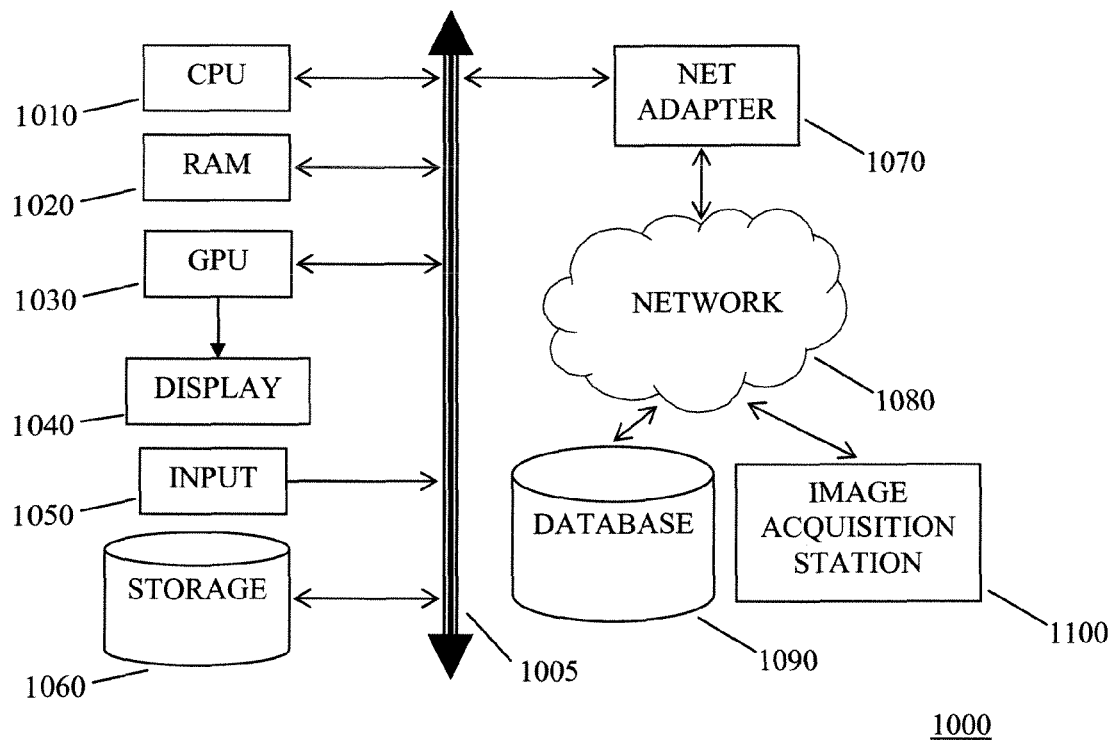
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1010, random access memory (RAM) 1020, a graphical processing unit (GPU) 1030 connected to a display unit 1040, a network adapter 1070 connected to a network 1080, for example an intranet or the Internet, an internal bus 1005, and one or more input devices 1050, for example, a keyboard, mouse etc. As shown, the system 1000 may be connected to a data storage device 1060, for example, a hard disk.

The CPU 1010 may access and/or receive image data from an image acquisition station 1100 and/or a database 1090, for example, via the network 1080. The image acquisition station 1100 may include an MR scanner, a CT scanner or any other form of medical imaging device. The database 1090 may include previously acquired image data, for example, MR datasets and/or CT data sets.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for registering images, comprising:
acquiring a reference image;
acquiring a moving image;
calculating an initial degree of registration between the reference and moving images;
calculating a gradient field for the reference image;
generating an incremental deformation based on the calculated gradient;
calculating a second degree of registration between an incrementally deformed reference image and the moving image;
determining whether the second degree of registration is greater than the initial degree of registration;
when the second degree of registration is greater than the initial degree of registration, applying an inverse of the incremental deformation to the moving image;
determining whether a second degree of registration is maximized, wherein a similarity function is used to determine whether the second degree of registration is greater than the initial degree of registration and to determine whether the second degree of registration is maximized, wherein the similarity function is optimized uses the equation:

$$\begin{cases} \phi^* = \phi_0 \cdot \delta_1^{-1} \cdot \delta_2^{-1} \cdot \ldots \cdot \delta_\infty^{-1} \\ \phi_k = id + \varepsilon \frac{\partial}{\partial \delta} S(I_1 \cdot \delta, I_2 \cdot \phi_0 \cdot \delta_1^{-1} \cdot \delta_2^{-1} \cdot \ldots \cdot \delta_{k-1}^{-1}) \Big|_{\delta=id} \end{cases}$$

wherein $\varepsilon > 0$ is sufficiently small to provide for the invertibility of $\delta_k$, id denotes the identity of mapping and $\delta_\infty$ represents $\delta_n$ for a value n sufficiently large to attain convergence criteria.

2. The method of claim 1, wherein the steps of generating an incremental deformation, calculating a second degree of registration and applying the inverse of the incremental deformation to the moving image when the second degree of registration is greater than the initial degree of registration, are repeated until the degree of registration is maximized.

3. The method of claim 1, wherein the similarity function is a mean square error function representing a sum of absolute differences between the intensities of the moving image and the reference image.

4. The method of claim 1, wherein a gradient field for an image is calculated only once.

5. A method for registering images, comprising:
acquiring a reference image;
acquiring a moving image;
calculating a gradient field for the reference image;
generating an incremental deformation based on the calculated gradient;
temporarily applying the generated incremental deformation to the reference image to determine whether the generated incremental deformation has increased a degree of registration between the reference and moving images; and
when the incremental deformation has increased the degree of registration between the images, applying an inverse of the incremental deformation to the moving image;
wherein a similarity function is used to determine whether the degree of registration has been increased and to determine whether the degree of registration is maximized; and
wherein a deformation field is initially unknown and is expressed according to the function: $\phi: \Re^3 \to \Re^3$, the reference image $I_1$ is represented by a scalar function $I_1: \Re^3 \to \Re$ and the moving image $I_2$ is represented by a scalar function $I_2: \Re^3 \to \Re$, and the similarity function is denoted by S, and wherein a displacement $u(\vec{x})$ is solved for at each point $\vec{x} \in \Re^3$ such that $\phi(\vec{x}) = \vec{x} + u(\vec{x})$.

6. A method for registering images, comprising:
acquiring a reference image:
acquiring a moving image;
calculating a gradient field for the reference image;
generating an incremental deformation based on the calculated gradient;
temporarily applying the generated incremental deformation to the reference image to determine whether the generated incremental deformation has increased a degree of registration between the reference and moving images; and
when the incremental deformation has increased the degree of registration between the images, applying an inverse of the incremental deformation to the moving image;
wherein a similarity function is used to determine whether the degree of registration has been increased and to determine whether the degree of registration is maximized; and
wherein the similarity function is optimized using the equation:

$$\begin{cases} \phi^* = \phi_0 \cdot \delta_1^{-1} \cdot \delta_2^{-1} \cdot \ldots \cdot \delta_\infty^{-1} \\ \phi_k = id + \varepsilon \frac{\partial}{\partial \delta} S(I_1 \cdot \delta, I_2 \cdot \phi_0 \cdot \delta_1^{-1} \cdot \delta_2^{-1} \cdot \ldots \cdot \delta_{k-1}^{-1}) \Big|_{\delta=id} \end{cases}$$

wherein $\varepsilon > 0$ is sufficiently small to provide for the invertibility of $\delta_k$, id denotes the identity of mapping and $\delta_\infty$ represents $\delta_n$ for a value rt sufficiently large to attain convergence criteria.

* * * * *